(12) United States Patent
Cornell (10) Patent No.: US 8,976,188 B1
(45) Date of Patent: Mar. 10, 2015

(54) OPTIMIZED DATA COMMUNICATION SYSTEM AND METHOD FOR AN IMAGE RENDERING SYSTEM

(75) Inventor: Brian Cornell, Kenmore, WA (US)

(73) Assignee: Google Inc., Mountain View, CA (US)

( * ) Notice: Subject to any disclaimer, the term of this patent is extended or adjusted under 35 U.S.C. 154(b) by 336 days.

(21) Appl. No.: 13/445,740

(22) Filed: Apr. 20, 2012

(51) Int. Cl.
*G06T 15/00* (2011.01)

(52) U.S. Cl.
USPC .......................................................... 345/557

(58) Field of Classification Search
CPC ........................................................ G06T 9/00
USPC ......................................................... 345/419
See application file for complete search history.

(56) References Cited

U.S. PATENT DOCUMENTS

| | | | |
|---|---|---|---|
| 4,901,251 A | 2/1990 | Sfarti | |
| 5,303,340 A | 4/1994 | Gonzalez-Lopez et al. | |
| 5,784,075 A | 7/1998 | Krech, Jr. | |
| 6,304,270 B1 | 10/2001 | Danielson et al. | |
| 6,369,813 B2 | 4/2002 | Pentkovski et al. | |
| 6,426,747 B1 * | 7/2002 | Hoppe et al. | 345/419 |
| 6,437,779 B1 | 8/2002 | Saito et al. | |
| 6,504,543 B1 | 1/2003 | Okamoto et al. | |
| 6,704,021 B1 | 3/2004 | Rogers et al. | |
| 6,717,577 B1 | 4/2004 | Cheng et al. | |
| 6,762,765 B2 | 7/2004 | Doyle et al. | |
| 6,791,560 B2 | 9/2004 | Lu | |
| 6,950,108 B2 | 9/2005 | Doyle et al. | |
| 6,977,652 B2 | 12/2005 | Senda et al. | |
| 7,071,935 B1 * | 7/2006 | Deering et al. | 345/419 |
| 7,170,512 B2 | 1/2007 | Southwell et al. | |
| 8,269,775 B2 | 9/2012 | Bourd et al. | |
| 8,558,842 B1 | 10/2013 | Johnson et al. | |
| 2004/0164985 A1 | 8/2004 | Kato et al. | |
| 2009/0066694 A1 * | 3/2009 | Redshaw et al. | 345/423 |

FOREIGN PATENT DOCUMENTS

WO     WO-00/04502 A1     1/2000

OTHER PUBLICATIONS

Deering, "Geometry Compression," 1995, SIGGRAPH '95 Proceedings of the $22^{nd}$ Annual Conference on Computer Graphics and Interactive Techniques, p. 13-20.*
Zhou, "Algorithms," 2001, retrieved on Jul. 1, 2014 from https://www.usenix.org/legacy/ev ents/usenix01/full_papers/zhou/zhou_html/node3.html.*

* cited by examiner

*Primary Examiner* — Kee M Tung
*Assistant Examiner* — Ryan D McCulley
(74) *Attorney, Agent, or Firm* — Marshall, Gerstein & Borun LLP (57) ABSTRACT

A graphics or image rendering system, such as a map image rendering system, receives image data from an image database, such as a map database, in the form of vector data having image object elements defined as sets of vertex data points. The image rendering system stores and tabulates the vertex data points used to render an image object element. A code specifies a number of vertex data points that can be obtained from a tracking table as well as an amount of vertex data points to be sent from the image database. An image rendering engine uses the stored and transmitted vertex data points to render the image object element to be displayed.

19 Claims, 6 Drawing Sheets

| Vector Code | Pointer(s) to Tracking Table Location(s) | Amount of Remaining Vertex Data Points to be Received |
|---|---|---|
| 0 | 1,2,3 | 0 |
| 1 | 1,2,4 | 0 |
| 2 | 1,2,5 | 0 |
| 3 | 1,2,6 | 0 |
| ⋮ | ⋮ | ⋮ |
| 213 | 8,9,10 | 0 |
| 214 | 8,9,11 | 0 |
| 215 | 8,9,12 | 0 |
| 216 | 9,10,11 | 0 |
| 217 | 9,10,12 | 0 |
| 218 | 9,11,12 | 0 |
| 219 | 10,11,12 | 0 |
| 220 | 1,2 | 1 |
| 221 | 1,3 | 1 |
| 222 | 1,4 | 1 |
| ⋮ | ⋮ | ⋮ |
| 245 | 6,7 | 1 |
| 246 | 6,8 | 1 |
| 247 | 7,8 | 1 |
| 248 | 1 | 2 |
| 249 | 2 | 2 |
| 250 | 3 | 2 |
| 251 | 4 | 2 |
| 252 | 5 | 2 |
| 253 | 6 | 2 |
| 254 | 7 | 2 |
| 255 | No Predetermined Grouping | 3 |

| Vector Code | Pointer(s) to Tracking Table Location(s) | Amount of Remaining Vertex Data Points to be Received |
|---|---|---|
| 0 | 1,2,3 | 0 |
| 1 | 1,2,4 | 0 |
| 2 | 1,2,5 | 0 |
| 3 | 1,2,6 | 0 |
| ⋮ | ⋮ | ⋮ |
| 213 | 8,9,10 | 0 |
| 214 | 8,9,11 | 0 |
| 215 | 8,9,12 | 0 |
| 216 | 9,10,11 | 0 |
| 217 | 9,10,12 | 0 |
| 218 | 9,11,12 | 0 |
| 219 | 10,11,12 | 0 |
| 220 | 1,2 | 1 |
| 221 | 1,3 | 1 |
| 222 | 1,4 | 1 |
| ⋮ | ⋮ | ⋮ |
| 245 | 6,7 | 1 |
| 246 | 6,8 | 1 |
| 247 | 7,8 | 1 |
| 248 | 1 | 2 |
| 249 | 2 | 2 |
| 250 | 3 | 2 |
| 251 | 4 | 2 |
| 252 | 5 | 2 |
| 253 | 6 | 2 |
| 254 | 7 | 2 |
| 255 | No Predetermined Grouping | 3 |

OPTIMIZED DATA COMMUNICATION SYSTEM AND METHOD FOR AN IMAGE RENDERING SYSTEM

FIELD OF TECHNOLOGY

The present disclosure relates to image rendering systems, such as electronic map display systems, and more specifically to an image rendering system that uses a vector code in combination with a tracking table compiled of previously transmitted vector image data to acquire stored vertex data points to be used in rendering an image on a display screen.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixelated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects to be displayed as part of an image via an image display device. In the context of a map image, such image objects may be, for example, individual roads, text labels, areas, text boxes, buildings, points of interest markers, terrain features, bike paths, map or street labels, etc. Each image object is generally made up or drawn as a set of one or more triangles (of different sizes, shapes, colors, fill patterns, etc.), with each triangle including three vertices interconnected by lines. Thus, for any particular image object, the image database stores sets of vertex data points, with each set of vertex data points defining one of the triangular image object elements making up the image object. Generally speaking, each vertex data point includes data pertaining to a two-dimensional or a three-dimensional position of the vertex (in an X, Y or an X, Y, Z coordinate system, for example) and various vertex attributes defining properties of the vertex, such as color properties, fill properties, line width properties for lines emanating from the vertex, etc.

The use of vector graphics can be particularly advantageous in a mobile map system in which image data is sent from a centralized map database via a communications network (such as the Internet, a wireless network, etc.) to one or more mobile or remote devices for display. In particular, vector data, once sent to the image rendering engine, may be more easily scaled and manipulated (e.g., rotated, etc.) than pixelated raster image data. The processing of vector image data however is typically much more time consuming and processor intensive on the image rendering engine that receives the data. Moreover, using vector image data that provides a higher level of detail or information to be displayed in a map leads to a higher amount of vertex data points or vertices that need to be sent to the map rendering device from the map database that stores this information, which can result in higher bandwidth requirements or downloading time in some cases.

This additional bandwidth requirement is unfortunate as the same vector data vertices are, in many cases, sent in multiple different vertex data points for different image object elements. Thus at any particular time, the same vertices likely may have previously been sent or downloaded within the image rendering system because adjacent image object elements often include one or more common vertices.

SUMMARY

An image rendering engine for an image rendering system capable of being communicatively coupled to a server device includes an image database that stores vector image data. The vector image data includes a plurality of sets of two or more vertex indicators, wherein each set of the plurality of sets of two or more vertex indicators is associated with a different one of a number of image object elements. The vertex indicator corresponds to a vertex data point of the image object element and may be the vertex data point itself, or a pointer to a vertex data point. The image rendering engine includes a communications network interface, one or more processors coupled to the communications network interface, a memory coupled to the one or more processors, and a display device coupled to the one or more processors. A tracking table resides within the memory and includes a plurality of vertex indicators previously received from the server device. A communications routine stored in the memory executes on the one or more processors to receive, for each of the image object elements, a set of vertex indicators and a vector code identifying zero or more vertex indicators to acquire from the tracking table. A decoder uses the vector code to identify zero or more vertex indicators of a set of vertex indicators associated with a particular image object element that reside within the tracking table to render vertex data points for the particular image object element, and to identify an amount of remaining vertex indicators of the set of vertex indicators associated with the particular image object element. An imaging routine stored on the memory, which when executed on the one or more processors, uses the set of vertex indicators associated with the particular image object element to render the particular image object element on the display device, such as a display screen.

If desired, separate tracking tables may be included in the image rendering engine and the server device. In addition, the image rendering system may include one or more lookup tables including a set of a plurality of categories of groups of pointers to the tracking table. Each grouping of pointers within a category may include an amount from zero to three pointers. The number of pointers within each of the groups of pointers within one category may be different than the number of pointers within each of the groups of pointers in a different category, and the vector code includes a value exclusively associated with each different group of pointers to the tracking table.

A table of possible vertex data points may be also implemented with the image rendering system to facilitate displaying the image on the display device. The table of vertex data points may be coupled to the image rendering engine wherein pointers into the table of vertex data points may be transmitted from the server device during image rendering. Similarly, pointers into the vertex data point table may also be stored in the tracking table. Additionally, the vertex indicators corresponding to each set of the plurality of sets of two or more vertex data points that are sent from the server device may be tabulated in the tracking table in a manner dependent upon a usage characteristic. The usage characteristic may be partially dependent upon an amount or a rate of the amount of times a particular vertex indicator, or data point, has been used during rendering of the image. An encoder, which may reside in the server device, utilizes the tracking table to identify one or more vertex indicators previously received by the image rendering engine and constructs the vector code. A communications routine executes on the processor to send the particular set of vertex indicators and the vector code identifying zero or more vertex indicators to acquire from the tracking table to the image rendering engine, via the communications network interface, for each of the image object elements.

In another embodiment, a method for use in an image rendering system includes a server device communicatively coupled to an image database that stores vector image data having a plurality of sets of two or more vertex data points wherein each set of the plurality of sets of two or more vertex data points is associated with a different one of a number of image object elements, and an image rendering engine communicatively coupled to the server device to receive the vector image data and to use the vector image data to render an image object element on a display device. The method receives a vector code identifying zero or more vertex indicators residing within a tracking table and corresponding to vertex data points of a set of the plurality of sets of two or more vertex data points associated with a particular image object element to use in rendering vertex data points for the particular image object element, and further identifies an amount of remaining vertex indicators corresponding to vertex data points of the set of the plurality of sets of two or more vertex data points associated with the particular image object element. The method may also decode the vector code to identify zero or more vertex indicators that reside within the tracking table and correspond to vertex data points of the set of the plurality of sets of two or more vertex data points associated with the particular image object element to use in rendering vertex data points for the particular image object element, and to identify the amount of remaining vertex indicators corresponding to vertex data points of the set of the plurality of sets of two or more vertex data points associated with the particular image object element. The method may also utilize the one or more identified vertex indicators residing within the tracking table to obtain the corresponding vertex data points of the set of the plurality of sets of two or more vertex data points associated with the particular image object element, and render the particular image object element from the obtained corresponding vertex data points on the display device.

DETAILED DESCRIPTION

A graphics or image rendering system utilizes a vector code and a tracking table to determine vertex data points of an image object element to be rendered on a display device. The tracking table stores vertex indicators that correspond to vertex data points previously received from an image database and the vector code for the image object element points to a set of vertex indicators tabulated within the tracking table. The vector code and tracking table cooperate to reduce or eliminate the amount and/or re-transmission of image data previously received from the image database, thereby increasing downloading speed and/or reducing communication bandwidth.

More specifically, the image rendering system, such as a map image rendering system, receives image object data from an image database, such as a map database, in the form of vector image data. The vector image data, which includes various image object elements to be displayed in an image, defines the image object elements using a plurality of sets of vertex indicators. Each vertex indicator may be a vertex data point that includes position and/or location data, or the vertex indicator may be a pointer to a vertex data point located within a table of vertex data points likely to be used during the rendering of the image. During image rendering, the same vertex indicator(s) may be repeatedly used or transmitted to the image rendering engine. To reduce communication bandwidth, the use of each vertex indicator may be monitored or tracked, and a predetermined amount of the tracked vertex indicators may be tabulated or stored in a tracking table. One way in which the tracked vertex indicators may be stored and/or tabulated in the tracking table is with respect to a usage characteristic, wherein the tracked vertex indicators are arranged in the tracking table in an order corresponding to an amount, recency, and/or a rate of times a particular vertex indicator is used during the rendering of the image. Thereafter, the vector image data transmitted for any particular image object element includes a vector code specifying zero or more of the vertex indicators stored in the tracking table to use in rendering the corresponding vertex data points of the associated image object element, as well as zero or more additional vertex indicators not available from the tracking table to use in rendering the remaining corresponding vertex data points of the associated image object element. In this manner, the image rendering system provides for previously used vertex indicators to be acquired from the tracking table instead of requiring another transmission or download of these vertex indicators. The reduction in transmission of frequently used vertex indicators allows for significantly less data to be sent to the image rendering engine from the image database or other application creating the image. This system thus allows for commonly used vertex indicators to be stored, readily accessible, and used to render an image, thereby avoiding the time associated with re-sending or re-downloading a significant amount of vertex indicators.

Figure 1:
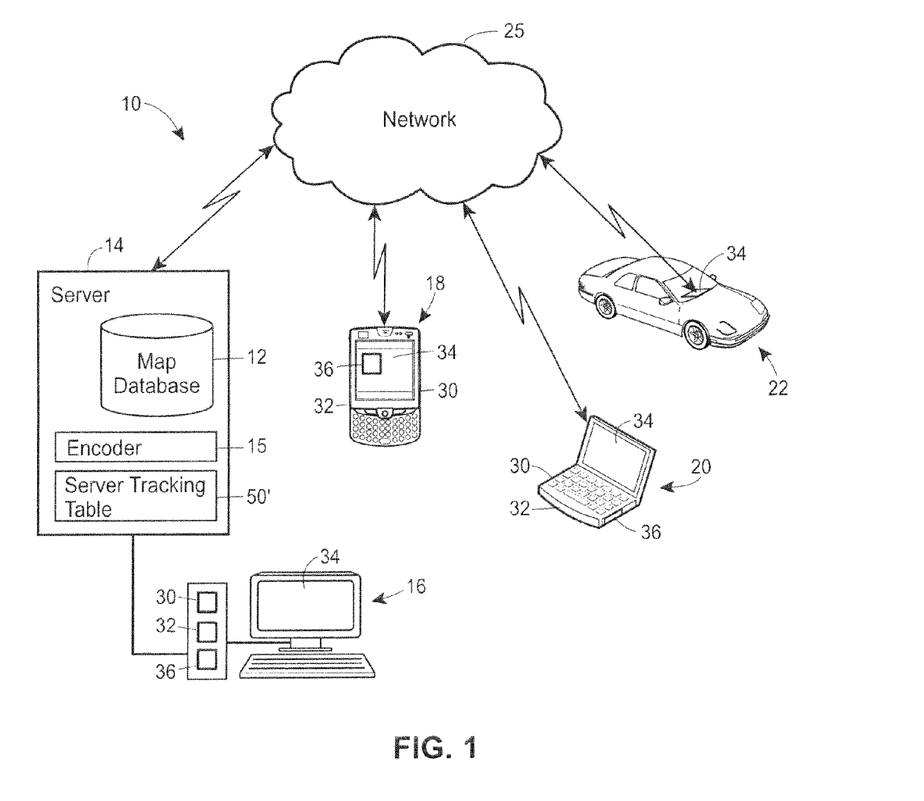
FIG. 1 is a high-level block diagram of one embodiment of a map imaging system that implements communications between a map database stored in a server and one or more map image rendering engines.

Referring now to FIG. 1, a map-related imaging system 10 includes a map database 12 stored in a server device 14 or in multiple server devices located at, for example, a central site or at various different sites. The system 10 further includes multiple map client devices 16, 18, 20, and 22, each of which stores and implements a map rendering device or a map rendering engine 40. The map client devices 16-22 may be connected to the server device 14 via any hardwired or wireless communication network 25, including for example a hardwired or wireless LAN, MAN or WAN, or any combination thereof. Some examples of map client devices 16-22 that may be implemented in the system 10, include, and are not limited to mobile phone devices 18, computers such a laptop, desktop or other types of computers 16, 20, components of other imaging systems such as components of automobile navigation systems 22, etc. The client devices 16-22 may be communicatively connected to the server device 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired type or kind of map data including raster image map data and vector image map data. However, the image rendering systems described herein are best suited for use with vector image data that defines or includes image object elements that each include a set of two or more vertices or vertex data points defining the image object elements to be displayed within an image. Generally speaking, each of the image object elements defined by the vector image data will have a plurality of vertices associated therewith and these vertices will be used to display a map-related image object to a user via one or more of the client devices 16-22. As will also be understood, each of the client devices 16-22 includes an image rendering engine 40 having one or more processors 30, one or more memories 32, a display device 34, and in many cases a rasterizer 36 that are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Typically, the map-related imaging system 10 of FIG. 1 operates such that a user, at one of the client devices 16-22, opens or executes a map application 48 (not shown in FIG. 1) that operates to communicate with and obtain map information or map related data from the map database 12 via the server device 14, and that then displays or renders a map image based on the received map data. The map application 48 may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on the display device or the display screen 34 using the system described below, each of the client devices 16-22 receives or downloads map data in the form of vector image data from the map database 12 and processes that vector image data using one or more image shaders 44, 46 to render an image on the associated display device 34.

Figure 2:
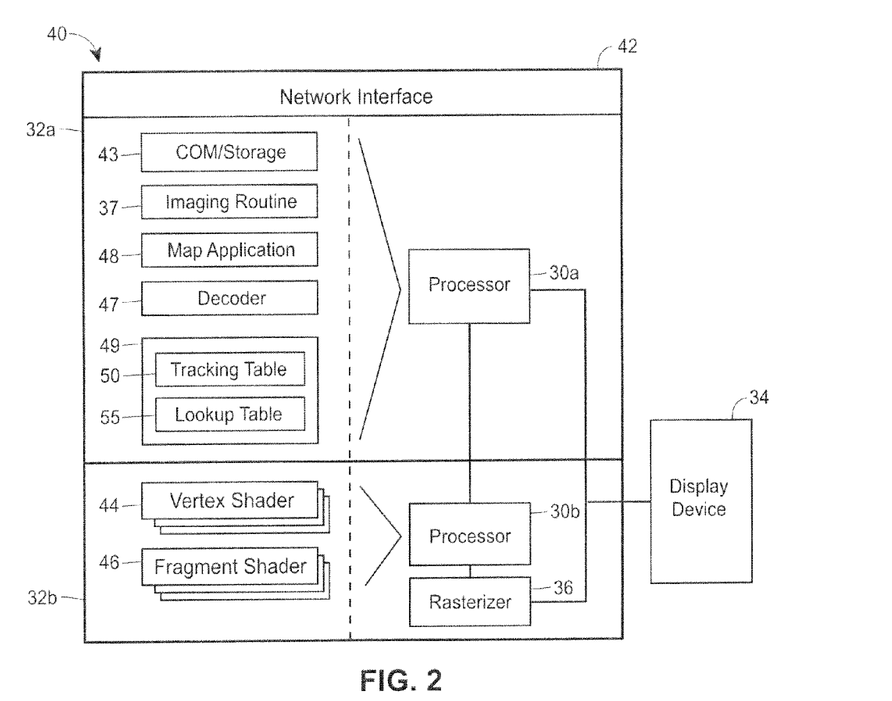
FIG. 2 is a high-level block diagram of one embodiment of an image rendering engine or device used to render map images using map vector data.

Referring now to FIG. 2, an example image generating or image rendering engine 40 associated with or implemented by one of the client devices 16-22 is illustrated in more detail. The example image rendering engine 40 of FIG. 2 includes two processors 30a and 30b, two memories 32a and 32b, a user interface 34, and a rasterizer 36. In this case, the processor 30b, the memory 32b, and the rasterizer 36 are disposed on a separate graphics card (denoted below the horizontal line), although this need not be the case in all embodiments. In other embodiments for instance, a single processor may be used instead. Additionally, the image rendering engine 40 may include a communications and storage routine 43, and one or more map applications 48 having map display logic therein. The map application 48 may be stored on the memory 32a, and may be executable on the processor 30a. Likewise, one or more image shaders in the form of, for example, vertex shaders 44 and fragment shaders 46, may be stored on the memory 32b and may be capable of being executed on the processor 30b. The memories 32a and 32b may include either or both volatile and non-volatile memory and the routines and shaders may be executed on either of the processors 30a and 30b to provide the functionality described below.

To facilitate data communication between the server device 14 and the display device 34, the imaging system 10 may utilize a network interface 42. The network interface 42 includes any well known software and/or hardware components that operate to communicate with, for example, the server device 14 of FIG. 1 to obtain image data in the form of vector image data for use in creating an image display on the user interface or display device 34. The image rendering engine 40 may also include a data memory 49, which may be a buffer or volatile memory for example, that may store vector image data received from the map database 12, for example, in a tracking table 50. The vector image data typically includes a number of image object elements, each including a set of two or more vertex data points. The vector image data may also include one or more lookup tables 55 as will be described in more detail.

During operation, the map logic of the map application 48 executes on the processor 30 to determine the particular vector image data requested for display to a user via the display device 34 using, for example, user input, GPS signals, pre-stored logic or programming, etc. The display or map logic of the application 48 interacts with the map database 12, using the communications routine 43, by communicating with the server device 14 through the network interface 42 to obtain map data, preferably in the form of vector image data or compressed vector image data from the map database 12. This vector image data is returned via the network interface 42 and may be decompressed and stored in the data memory 49 by the communications routine 43. In particular, the data transmitted or downloaded from the map database 12 may be a compact, structured, or otherwise optimized version of the ultimate vector image data to be used and the map application 48 may operate to transform the downloaded vector image data into specific vertex data points using the processor 30a.

Generally, vertex data points are used in vector based imaging systems to define a particular field, e.g., a triangular image object element, of pixel values to be displayed at a location or at a field within an image being rendered. Additionally, the vector image data for each image object element may include vertices that are also associated with one or more other image object elements making up the image. More particularly, each image object element includes two or more vertices (defined by vertex data points) and each vertex data point has vertex data associated therewith. In one embodiment, the vector image data sent from the server device 14 generally defines data for each of a set of two or more vertex data points associated with one of a number of different triangular image object elements to be displayed as an image object, and ultimately an image, on the screen 34. Each vertex data point includes vertex location data defining a two-dimensional or a three-dimensional position or location of the vertex in a reference or virtual space. Each vertex data point may additionally include other information, such as, for example, an object type identifier that identifies the type of image object with which the vertex data point is associated, an attribute reference (sometimes referred to as a style or feature reference) that references or points to a location or a set of locations in one or more other lookup tables downloaded and stored in the data memory 43, etc.

Figure 3:
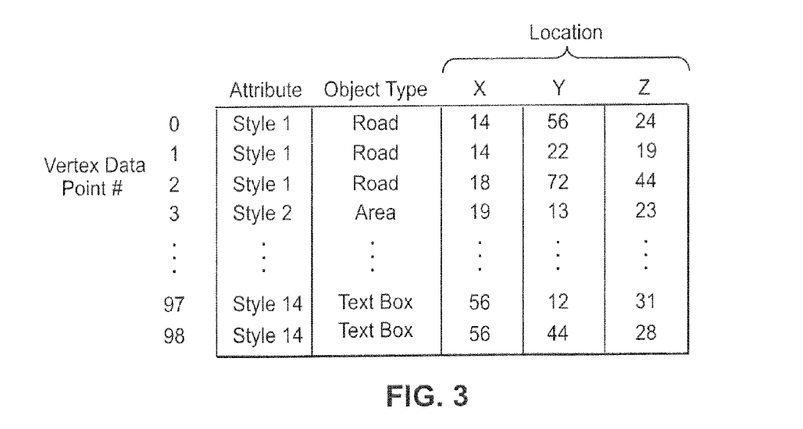
FIG. 3 is a data diagram illustrating an example set of vector data in the form of vertex data points with accompanying vertex attribute reference(s).

FIG. 3 illustrates an exemplary set of vertex data points that may be transmitted, downloaded, or otherwise obtained from the map database 12. In the example of FIG. 3, the first set of three vector data points defines a first image object element, the second set of three vertex data points defines a second image object element, etc. The vertex data points of each image object element may be stored in the memory 49 as an image object element prior to being processed by the image rendering engine 40. Moreover, some of the downloaded vertex data points may additionally be stored within a tracking table 50 shown in FIG. 2. As illustrated in FIG. 3, the vector image data for an image object element may include a data set for each vertex data point of the image object element, with the example set of image object elements of FIG. 3 having 99 total vertex data points (numbered 0-98). In this case, each vertex data point includes two location values (defined in the columns labeled X and Y) and a depth value (defined in the column Z). Each location value indicates a value or position of the associated vertex data point in one of two coordinate axes of a virtual or reference two-dimensional space (e.g., an X, Y coordinate system), and the depth value indicates a depth of the vertex data point with respect to other image object elements in the virtual coordinate space.

As illustrated in FIG. 3, each vertex data point may also include an object type property (in the second column of the table of FIG. 3) and an attribute reference (in the first column of the table of FIG. 3). The object type property defines the type of image object to which the vertex data point pertains and may be used to select the appropriate image shader to use to process the vertex data when rendering an image on a display screen. Of course, any different numbers and types of image objects may be used and the numbers and types of image objects used in any particular image rendering system will be determined by the type of image being rendered. For example, vector map images may have image object types in the form of road objects, text objects, area objects, text box objects, and arrow objects, to name but a few. However, other types and kinds of image objects could be used in map images and in other types of images, such as three-dimensional images, and the system described herein is not limited to the image objects described above.

The image rendering system 10 described herein utilizes an encoding and/or decoding technique that takes vertex indicators, which may include vertex data points and pointers to vertex data points stored within a vertex data point table, that would normally be sent through the communications network and stored in data memory 49 within the image rendering engine 40, or that would be sent from the processor 30a to the processor 30b as raw data values, and instead, encodes a vector code 45 to be implemented with the tracking table 50 to facilitate transmission of and access to the vertex indicators, e.g., vertex data points, for different image object elements. This encoding and/or decoding technique can be advantageous when the same vertex data points are repeatedly used as vertices of different image object elements, either for the same image object or for different image objects that share one or more vertex data points. For instance, adjacent image object elements within a particular image object may share a common vertex data point.

Due in part to this "communal" use, a common vertex data point may be downloaded to the client device, e.g., image rendering engine 40, as part of a first image object element, and a copy of the common vertex data point may be placed within the tracking table 50 and later used to determine a vertex data point of a subsequent image object element. In this example, a value or reference pointing to the location of the common vertex data point within the tracking table 50 may be sent within the vector code 45 for the vertex data point of the image object element instead of sending the vertex data point itself. In situations where not all vertex data points being sent or downloaded to the image rendering engine 40, as part of a particular image object element, are available within the tracking table 50, the vector code 45 may indicate to the image rendering engine 40 to expect to receive the complementary amount of vertex data points to be sent from the server device 14. This encoding technique therefore allows image object elements to be rendered by referencing or pointing the image rendering engine 40 to one or several locations within the tracking table 50 that already contain the vertex data points of a particular image object element and thereby eliminates or reduces the need to resend the entire image data vector, e.g., X, Y, and Z location, object type, attribute, of each vertex data point. As a result of the reduction in the amount of data that is typically sent within the image rendering process, it is possible to obtain a related decrease in the time it takes to render a requested image object.

Figure 4:
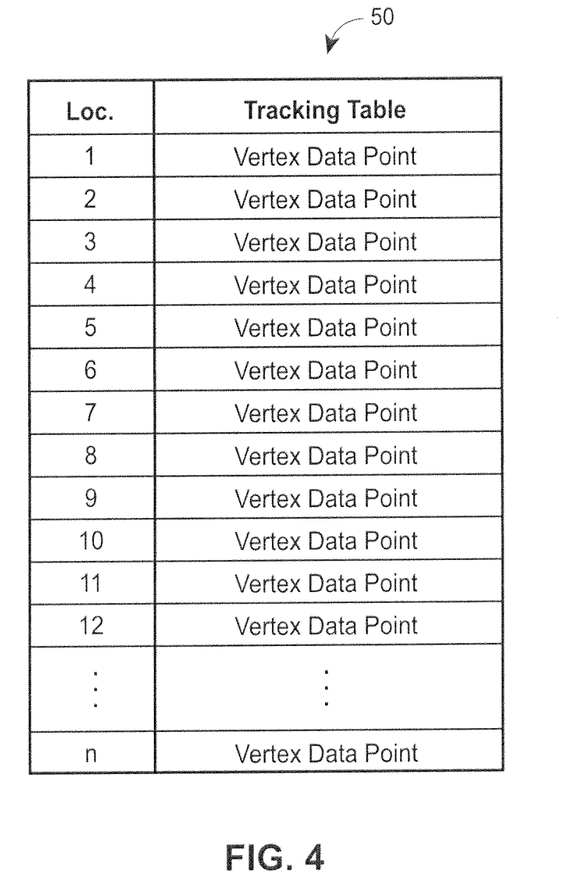
FIG. 4 is an example of a tracking table depicting vertex indicators, e.g., vertex data points, that have been utilized during the rendering of an image and stored within the tracking table.

FIG. 4 illustrates an example tracking table 50 residing within the memory 49. The tracking table 50 includes a tabulation of a subset of vertex data points that have been transmitted, used, downloaded, or otherwise sent, from the server device 14 to the image rendering engine 40. Any desirable predetermined amount, n, of vertex data points may be contained within the tracking table 50 and these vertex data points may be compiled and ordered in the tracking table 50 in any desirable manner.

In one example embodiment of the tracking table 50, the compilation of vertex data points within the tracking table 50 may be dependent upon a usage characteristic, which may, for example, be partially or wholly dependent upon an amount or rate at which a particular vertex data point has been used during the rendering of an image. The order or rank of the vertex data points tabulated within the tracking table 50 may, for example, be dependent upon the number of times and/or the recentness a particular vertex data point has been used in the rendering of an image. Alternatively, the vertex data points may be stored in the tracking table 50 based on a combination of their use, recency, and/or their rate of use during the rendering of an image. The ranking of vertex data points within the tracking table 50 then may not only depend upon the number of times a vertex data point has been used, but how frequently or recently the vertex data point was used over a prescribed time period. For example, if a vertex data point happens to be used more recently than another vertex data point that may have been used more times over a particular period of time, but not recently, the more recently used vertex data point may rank higher in the tracking table 50.

In view of the routines described above for storing used vertex data points in the tracking table 50 during the rendering of an image, it is evident that the ordering of the used vertex data points may change within the tracking table 50, and the identity of the vertex data points shown within the tracking table 50 may change while an image is being rendered. In other words, as the value of the usage characteristic of the vertex data point(s) changes, the sequence, and perhaps the identity of some vertex data points themselves that reside within the tracking table 50 may change or be affected, e.g., after each additional image object element is downloaded from the server device 14.

Referring again to FIG. 2, during the rendering of an image, the communications routine 43 stored on the memory 32a executes on the processor 30a to receive the image data from the server device 14 via the communications network interface 42. The image data includes the identity and position of any vertex indicator(s), e.g., vertex data point(s), that may reside within the tracking table 50. That is, for each of the image object elements being received at the image rendering engine 40, the routine 43 receives a bundle or packet of information that may include a set of vertex data points for a particular image object element and a vector code 45 that identifies zero or more vertex data points that may be acquired from the tracking table 50 for that particular image object element. A decoder 46 decodes the vector code 45 to identify zero or more vertex data points of the set of vertex data points associated with the particular image object element that reside within the tracking table 50 to use as vertex data points during rendering of the particular image object element. The vector code 45 may also identify an amount of remaining vertex indicators, e.g., vertex data points, of the set of vertex indicators associated with the particular image object element that still need to be received from the server device 14 for that particular image object element.

Figure 5:
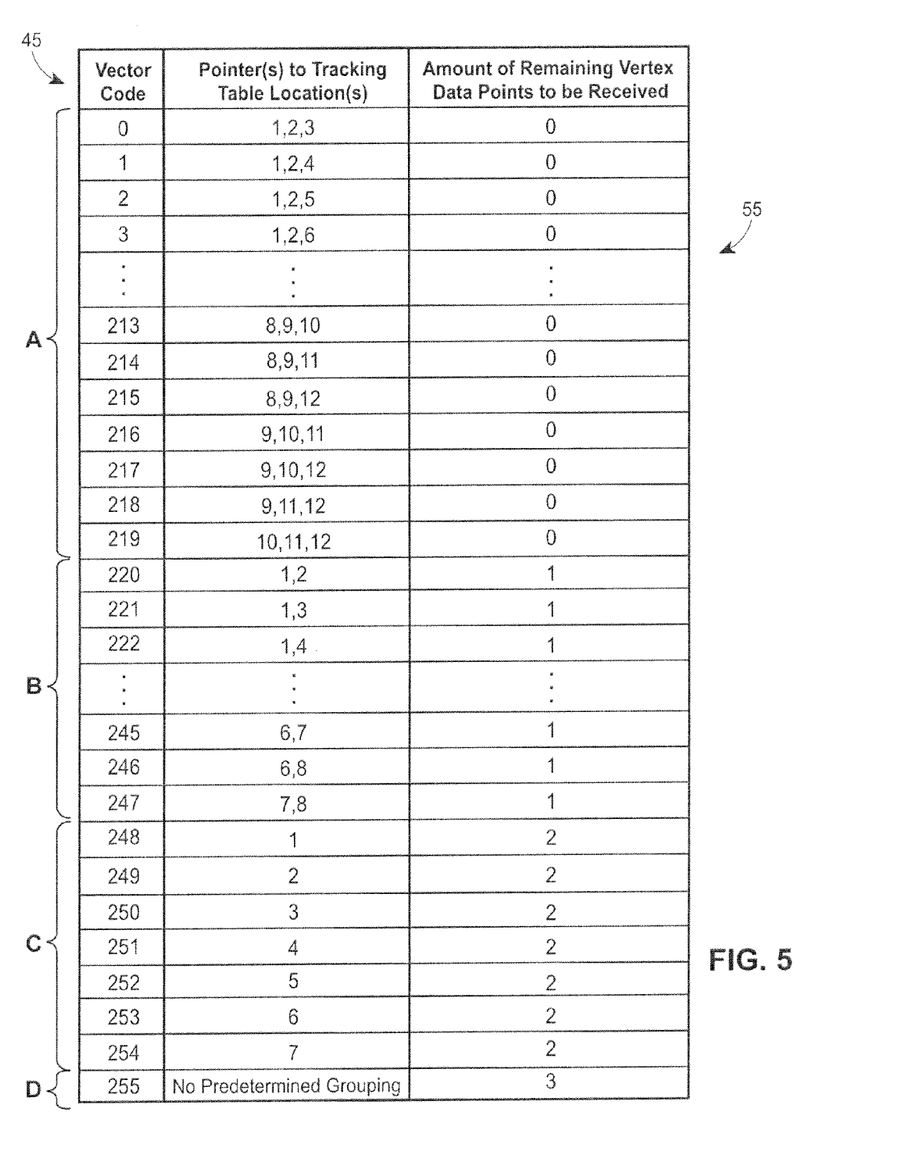
FIG. 5 is an example of a lookup table that may reside within memory and includes a plurality of locations, wherein each location may include at least one pointer referencing to the tracking table.

If desired, a vector code lookup table 55, such as that shown in FIG. 5, can be implemented with the tracking table 50 and the vector code 45 to facilitate the transmission, downloading, or decoding of the vector code data received from the server device 14. The vector code lookup table 55 includes a plurality of sets of pointers to the tracking table 50. Each of the numerous locations in the first column of the lookup table 55 corresponds to one value of the vector code 45, and each set of the plurality of sets of pointers contained within an individual location of the second column of the lookup table 55 includes a set of zero to three pointers to the tracking table 50. As such, each different value of the vector code 45 is exclusively associated with one set of the plurality of sets of pointers to the tracking table 50. Moreover, the third column of the lookup table 55 may identify the amount of remaining vertex data points to be received from the server device 14 because some or all of these vertex data points are not available in the tracking table 50.

The size of the tracking table 50, lookup table 55, and vector code 45 may be determined based on the preferences of the user. For purposes of description, however, one example is now described wherein the tracking table 50 is capable of monitoring and listing twelve vertex data points according to one or more selected usage characteristics. In this example, the lookup table 55 shown in FIG. 5 contains a location for each possible group of three vertex data points among a field of the top twelve ranked vertex data points tracked within the tracking table 50. Thus, each group of three vertex data points among the field of the twelve vertex data points tracked within the tracking table 50 is exclusively associated with a distinct location within the lookup table 55; and further, each of these locations within the lookup table 55 corresponds to a distinct value of the vector code 45. Said differently, a set of three pointers to the tracking table 50 (one for each vertex data point in the group of three) exists within each of the locations in the lookup table 55 that is associated with the groups of three vertex data points among the twelve vertex data points tracked and listed within the tracking table 50. These sets of pointers to the tracking table 50, which represent the groups of three vertex data points within the top twelve ranked vertex data points tracked within the tracking table 50, are identified in sector or category A of FIG. 5 and include vector code values of 0-219.

Because there are a possible 220 groups of three vertex data points among the twelve highest ranked vertex data points residing in the tracking table 50, there are 220 corresponding locations represented within the lookup table 55 (sector A). As a note, an individual vertex data point cannot be used more than once within an image object element because a duplicate vertex data point is unnecessary to identify an image object element, nor is the order of individual vertex data points within a group significant in identifying an image object element. So, for a group of three vertex data points residing within the second (represented by '2'), fifth (represented by '5'), and eighth (represented by '8') locations of the tracking table 50, the following groups are considered to be equivalent: (2, 5, 8), (2, 8, 5), (5, 2, 8), (5, 8, 2), (8, 2, 5), and (8, 5, 2). Therefore, the corresponding sets of three pointers to the respective locations within the tracking table 50 for these six groups of vertex data points can all be represented by one distinct vector code value within the lookup table 55, i.e., (2, 5, 8). Referring to the example lookup table 55 in FIG. 5, the associated location within the lookup table 55 for the (2, 5, 8) set of pointers is within sector A. Also, because each vector code value in sector A has three vertex data points associated therewith, no further vertex data points need to be sent with the vector code as shown in the last column of FIG. 5.

The lookup table 55 in this example also includes locations that each contain a set of two pointers to locations within the tracking table 50. More specifically, a distinct vector code value for each group of two vertex data points within a field of eight of the top-ranked vertex data points residing within the tracking table 50 is exclusively associated with a set of two pointers to locations within the tracking table 50. The total amount of groups of two vertex data points among eight of the top-ranked vertex data points existing in the tracking table 50 require 28 distinct locations within sector B of the lookup table 55. Also, because each vector code value in sector B has two vertex data points associated therewith, one additional vertex data point needs to be sent with the vector code as shown in the last column of FIG. 5.

Additionally, the lookup table 55 in this example further includes a distinct location containing one pointer to the tracking table 50 for each of the top-ranked seven vertex data points tracked in the tracking table 50, which are depicted in sector C. These seven distinct locations are categorized in sector C of the lookup table 55 and because each vector code value has only one vertex data point associated therewith, two additional vertex data point need to be sent with the vector code as shown in the last column of FIG. 5.

The lookup table 55 in this example also includes a single location, sector D, containing a vector code value that signifies that the image object element being sent does not include a group of vertex data points that are represented by the sets of pointers within the other categories, namely sectors A, B, or C of the lookup table 55. Thus, three vertex data points will need to be sent with the vector code as shown in the last column of FIG. 5.

There are 256 locations within the lookup table 55 utilized to cover the desired combinations of tracked and listed vertex data points within the tracking table 50 described in the example lookup table 55 above. Thus, for an image rendering system using the lookup table 55 and the tracking table 50 described in the above example, the vector code 45 can contain a value distinctly representing any of the 256 depicted combinations and thus can be represented with a single byte of data. It is to be understood of course that more or less vertex data points can be tracked and more or less, or different, groupings of combinations of vertex data points can be represented within the lookup table, etc., and moreover, the system is not restricted to the example described above and therefore may incorporate different sized tables and vector codes as desired.

As illustrated in FIG. 1, an additional tracking table 50' (referred to herein as a server tracking table), which may essentially be a duplicate of the tracking table 50 (i.e., the client tracking table), can be communicatively coupled to or separate from the server device 14. An encoder 15, which may be coupled to the server device 14, may use the additional tracking table 50' to construct the vector code 45 wherein the one or more vertex data points that the image rendering engine 40 may attain from the client tracking table 50 are identified within the vector code 45. The encoder 15 may also utilize a reverse-lookup table (not shown) to facilitate transmitting or downloading the vector image data to the image rendering engine 40. As the name implies, the reverse-lookup table is essentially the reverse, or opposite of the lookup table 55, wherein if the vertex data point to be transmitted or downloaded resides within the tracking table 50', a pointer to the location where the vertex data point resides within tracking table 50 can be determined, and therefore included within the vector code 45.

In another example embodiment of the image generating or image rendering engine 40 associated with or implemented by one of the client devices 16-22, the vertex indicators used to facilitate transmission of vector image data to the display screen may be a pointer to a location holding a vertex data point. In this example embodiment, a vertex data point table may be utilized. The vertex data point table includes a plurality of memory locations, each containing a single vertex data point that may likely to be used during the rendering of an image on the display screen. The vertex data point table may be transmitted from the server device 14 or provided to the image rendering engine 40 in some other manner, e.g., downloading from a portable memory storage device. The vertex data point table may be provided, e.g., transmitted, with each transmission of vector image data from the server device 14 or only once, and may be temporarily stored or retained within the image rendering engine 40 for a predetermined period of time. Utilizing pointers to the table of vertex data points provides for the vertex data point information to be transmitted perhaps only one time from the server device 14, and then most, if not all, subsequent uses of the vertex data point may be referenced through the transmission of a location pointer into the table of vertex data points. Similarly, the tracking tables 50, 50' may also tabulate pointers to the table of vertex data points instead of the vertex data points themselves. That is, a table of possible vertex data points may initially be sent to the image rendering device 14. Image objects are then encoded, but instead of transmitting vertex data points and storing them in the tracking table, pointers that correspond to the vertex data points are transmitted and also tabulated within the tracking tables 50, 50'. The use of a smaller-sized pointer to a vertex data point as the vertex indicator may improve transmission capabilities within the image render system.

Figure 6:
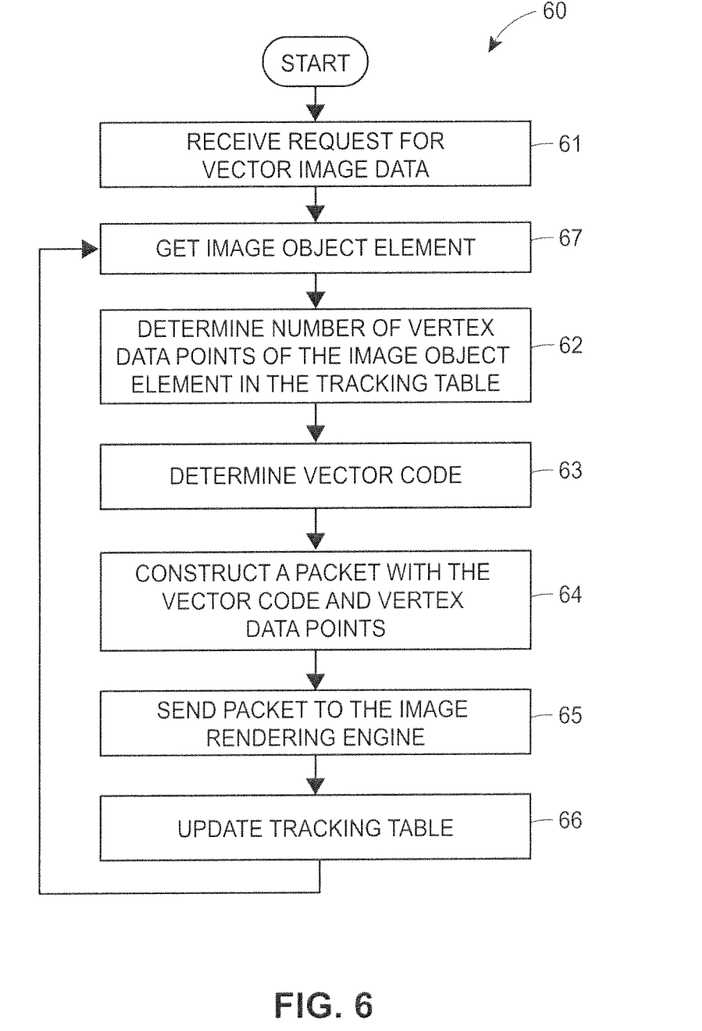
FIG. 6 illustrates an example routine or process flow diagram to render map images using the image rendering system shown in FIGS. 1 and 2.

Referring now to FIG. 6, an example process or routine 60 that may be implemented by a graphics or image rendering system, such as the image rendering system 10 of FIG. 1, to render an image using the techniques disclosed herein is described. For example, in response to logic within the map application 48 determining or requesting that vector image data be received or downloaded from the map database 12 to generate a particular image at a block 61, the server 14 gets the image object element for sending to the image rendering engine 40 at a block 67. The server tracking table 50' is consulted at a block 62 to determine the number of vertex indicators (in this example, vertex data points) residing within the tracking table 50'. A vector code value is determined at a block 63 based on the number of vertex data points that are available from the tracking table. At a block 64, a packet of information including the vector code and the corresponding amount of vertex data points is constructed.

More specifically, if none of the vertex data points of the image object element reside within the tracking table 50', the constructed packet of data includes a vector code 45 indicating to the image rendering engine 40 that no vertex data points of the associated image object element that is being sent with the packet at that moment reside within the client tracking table 50, and that the image rendering engine 40 should soon expect to receive vector image data for three vertex data points, which may be included in the packet. If, however, at least one vertex data point of the particular image object element resides within the tracking table 50', a packet is constructed including a vector code 45 having a value indicating to the image rendering engine 40 that one or more vertices of the associated image object element that is being sent with the packet at that moment reside within the client tracking table 50 and where such vertex data point(s) resides within the tracking table 50. The constructed packet in this instance may also include the vertex data point for any vertex data point that is not available from the tracking table 50.

The amount of vertex data points included in the packet depends of course on whether one, two, or three vertex data points of the particular image object element reside within the tracking table. That is, the vector code may indicate to the image rendering engine 40 where to attain the vertex data point(s) from the client tracking table 50 and to expect to receive the complementary amount of vertex data points from the server map database 12, which may be included in the packet. For example, referring again to FIG. 5 (last column), the image rendering engine 40 will expect to receive one additional vertex data point if the vector code value indicates only two vertex data points for a particular image object element are residing within the tracking table 50. Further, two additional vertex data points should be expected to be received at the image rendering engine 40 if a vector code value indicates that only one vertex data point for a particular image object element is residing within the tracking table 50. Additionally, in situations where three vertex data points being sent or downloaded to the image rendering engine 40, as part of a particular image object element, are available within the tracking table 50, the vector code 45 may indicate where to attain the vertex data points in the client tracking table 50 and may also indicate to the image rendering engine 40 not to expect to receive any vertex data points to be sent from the server device 14. As noted earlier, three additional vertex data points should be expected to be received at the image rendering engine 40, and may be included within the packet, if a vector code value indicates that no vertex data point for a particular image object element is residing within the tracking table 50.

Upon completion of the constructed packet of vector image data, the packet of vector image data including the associated vector code and the corresponding amount of vertex data points is sent to the image rendering engine 40 at a block 65. In all instances where vertex data points are used, regardless of whether they were accessed from the client tracking table 50 by the image rendering engine 40 or not, the server tracking table 50' will be updated at a block 66 to reflect the use of the vertex data points of the particular image object element and tabulated within the tracking table 50'. In one instance, the vertex data points used to render the image may be stored within the tracking table 50' based on the amount of times the vertex data point has been used up to that point in the rendering of the image. The tracking table 50' therefore generally stores the most used vertex data point in the first position of the tracking table 50', the second most used vertex point in the second position of the tracking table 50', and so on. Also, even though a predetermined amount of locations within the tracking table 50' are used to store the used vertex data points, the usage of more vertex data points other than those "listed" in the tracking table 50' may still be tracked and tabulated. Thus, while twelve vertex data points may be listed within the tracking table 50', additional vertex data points may be tracked and monitored as well, but simply not listed within the tracking table 50'. The contents of the tracking table 50' is therefore continually evolving during the rendering of an image due to the movement of used vertex data points up and down, as well as in and out, of the tracking table 50'.

After the server tracking table 50' has been updated with the most recently used vertex data points, the server 14 attains the next image object element at a block 67 to be sent to the image rendering engine 40, if necessary, and continues as described above until additional vector image data is no longer available.

Figure 7:
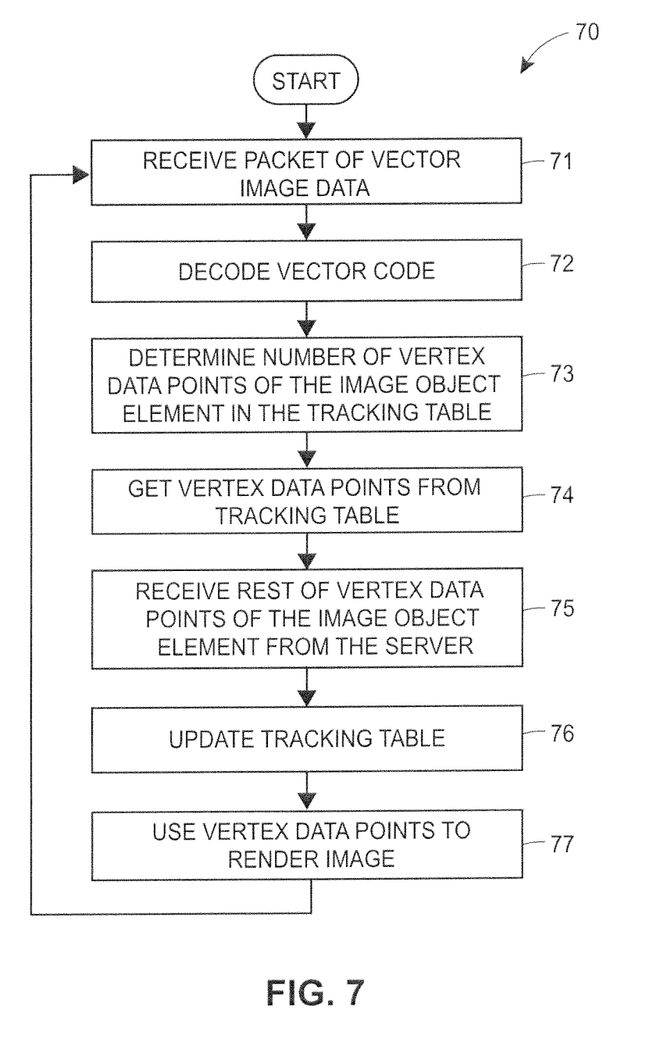
FIG. 7 illustrates another example routine or process flow diagram to render map images using the image rendering system shown in FIGS. 1 and 2.

Referring now to FIG. 7, an example process or routine 70 that may be implemented by a graphics or image rendering engine 40, such as within image rendering system 10 of FIG. 1, to render an image using the techniques disclosed herein is described. For example, in response to logic within the map application 48 determining or requesting that vector image data be received or downloaded from the map database 12 to generate a particular image, packets of vector image data are received at the image rendering engine 40 from the map database 12 at a block 71. Each packet of vector image data represents an image object element and may include a vector code 45 and a set of vertex indicators, e.g., vertex data points or pointers to vertex data points (in this example, vertex data points), wherein each vertex data point may include spatial location values as well as at least one attribute reference value.

At a block 72, the decoder 47 of the image rendering engine 40 decodes the vector code 45. The number of vertices of the image object element received within the packet of vector image data that reside within the tracking table 50 is determined at a block 73 and the vertex data points residing within the tracking table 50 are attained at a block 74. Any vertex data points not residing within the tracking table 50 are received at a block 75. These vertex data points may have been included within the packet with the vector code, or may have been sent separately.

Depending of course on whether all, some, or none of the vertex data points of the particular image object element reside within the tracking table 50, the image rendering engine 40 will attain the amount of vertex data points specified by the vector code from the tracking table 50 and expect to receive the complementary amount of vertex data points from the server database 14. That is, referring again to the last column of FIG. 5, the image rendering engine 40 will expect to receive no additional vertex data point from the server 14 if the vector code has a value indicating that three vertex data points reside within the tracking table 50, will expect to receive one additional vertex data point from the server 14 if the vector code has a value indicating that two vertex data points reside within the tracking table 50, will expect to receive two additional vertex data points from the server 14 if the vector code 45 has a value indicating that only one vertex data point resides within the tracking table 50, or will expect to receive three additional vertex data points from the server 14 if the vector code 45 indicates that no vertex data points reside within the tracking table 50.

In all instances where vertex data points are used to render an image, regardless of whether they were accessed from the tracking table 50 or not, a block 76 updates the tracking table 50 to reflect the use of the vertex data points of the particular image object element. The acquired vertex data points are sent to the image display device at a block 77, and the next packet of vector image data is then received, decoded, utilized, etc., until no further image object elements are received.

It is apparent from the description above that faster image rendering times can be attained in part by utilizing a vector code and a collection of vertex indicators, e.g., vertex data points and pointers to vertex data points, that were also portions of previously downloaded image object elements. The collection of vertex data points may be compiled in accordance with a variety of user preferences and are readily accessible, thus reducing the need to resend vertex data points that were used earlier to render a portion of the image.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for rendering map or other types of images through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An image rendering engine for communicatively coupling with a server device having an image database that stores vector image data, the vector image data including a plurality of sets of two or more vertex data points, wherein each set of the plurality of sets of two or more vertex data points is associated with a different one of a number of image object elements, the image rendering engine comprising;
   a communications network interface;
   one or more processors coupled to the communications network interface;
   a memory coupled to the one or more processors;
   a display device coupled to the one or more processors;
   a tracking table residing within the memory and including a plurality of vertex indicators previously received from the server device;
   a communications routine stored in the memory that executes on the one or more processors to receive, for each of the image object elements, a set of vertex indicators and a vector code identifying zero or more vertex indicators to acquire from the tracking table;
   a decoder that uses the vector code to identify zero or more vertex indicators of a set of vertex indicators associated with a particular image object element that reside within the tracking table, and to identify an amount of remaining vertex indicators of the set of vertex indicators associated with the particular image object element;
   a lookup table that maps the vector code to a set of pointers to the tracking table, wherein the lookup table includes a plurality of ranges of input values, wherein the plurality of ranges of input values includes a range that maps to sets of pointers each having at least two pointers, and wherein the lookup table includes a one-to-one mapping of vector codes to sets of pointers to the tracking table; and,
   an imaging routine stored on the memory which, when executed on the one or more processors, uses the set of vertex indicators of the particular image object element to render the particular image object element on the display device.

2. The image rendering engine of claim 1, wherein the vertex indicators are vertex data points.

3. The image rendering engine of claim 1, wherein the vertex indicators are pointers pointing to vertex data points residing in a table of vertex data points, each pointer associated to a separate vertex data point.

4. The image rendering engine of claim 1, wherein the vector code can be one of a range of values, each value within the range of values associated with a category of a plurality of categories of grouped pointers to the tracking table, each category of the plurality of categories of grouped pointers to the tracking table having a different number of pointers.

5. The image rendering engine of claim 1, wherein the tracking table includes a fixed number of vertex indicators selected in a manner dependent upon a usage characteristic.

6. The image rendering engine of claim 5, wherein the usage characteristic is dependent upon an amount of times a particular vertex indicator is used to render the image.

7. The image rendering engine of claim 5, wherein the usage characteristic is dependent upon a rate of an amount of times a particular vertex indicator is used to render the image.

8. The image rendering engine of claim 5, wherein the usage characteristic is dependent upon a recentness a particular vertex indicator is used to render the image.

9. The image rendering engine of claim 1, wherein the one or more processors update the tracking table after each image object element is received.

10. A method for use in an image rendering system including a server device communicatively coupled to an image database that stores vector image data including a plurality of sets of two or more vertex data points wherein each set of the plurality of sets of two or more vertex data points is associated with a different one of a number of image object elements, and an image rendering engine communicatively coupled to the server device to receive the vector image data and to use the vector image data to render an image object element on a display device, the method comprising:
   using a processor to receive a vector code identifying zero or more vertex indicators residing within a tracking table stored in the image rendering engine and corresponding to vertex data points of a set of the plurality of sets of two or more vertex data points associated with a particular image object element, and further identifying an amount of remaining vertex indicators corresponding to vertex data points of the set of the plurality of sets of two or more vertex data points associated with the particular image object element;

using a lookup table that maps the vector code to a set of pointers to the tracking table to decode the vector code to identify zero or more vertex indicators that reside within the tracking table and correspond to vertex data points of the set of the plurality of sets of two or more vertex data points associated with the particular image object element, and to identify the amount of remaining vertex indicators corresponding to vertex data points of the set of the plurality of sets of two or more vertex data points associated with the particular image object element, wherein the lookup table includes a plurality of ranges of input values, wherein the plurality of ranges of input values includes a range that maps to sets of pointers each having at least two pointers, and wherein the lookup table includes a one-to-one mapping of vector codes to sets of pointers to the tracking table;

using a processor to utilize the one or more identified vertex indicators residing within the tracking table to obtain the corresponding vertex data points of the set of the plurality of sets of two or more vertex data points associated with the particular image object element; and, using a processor to render the particular image object element from the obtained corresponding vertex data points on the display device.

11. The method of claim 10, wherein the vertex indicators are vertex data points.

12. The method of claim 10, wherein the vertex indicators are pointers pointing to vertex data points residing in a table of vertex data points, each pointer associated to a separate vertex data point.

13. The method of claim 10, further comprising tabulating the vertex indicators into the tracking table.

14. The method of claim 10, wherein the tracking table includes a fixed number of vertex indicators selected in a manner dependent upon a usage characteristic.

15. The method of claim 14, wherein the usage characteristic is dependent upon an amount of times a particular vertex indicator has been used during the rendering of an image.

16. A server device for an imaging rendering system, the server device communicatively coupled to an image rendering engine, the server device comprising:

an image database that stores vector image data, the vector image data including a plurality of sets of two or more vertex data points wherein each set of the plurality of sets of two or more vertex data points is associated with a different one of a number of image object elements;

one or more server processors;

a server memory coupled to the one or more server processors;

a server tracking table stored on the server memory communicatively coupled to the one or more server processors, including a plurality of vertex indicators previously sent from the server device to the image rendering engine, the vertex indicators corresponding to vertex data points;

an encoder that uses the server tracking table to identify one or more vertex indicators previously sent by the server device to the image rendering engine to construct a vector code for each of the image object elements, the vector code identifying zero or more vertex indicators to acquire from a tracking table in the image rendering engine;

a server lookup table stored on the server memory that maps the vector code to a set of pointers to the tracking table, wherein the lookup table includes a plurality of ranges of input values, wherein the plurality of ranges of input values includes a range that maps to sets of pointers each having at least two pointers, and wherein the lookup table includes a one-to-one mapping of vector codes to sets of pointers to the tracking table; and a communications routine stored in the server memory that executes on the one or more server processors to send via the communications network interface to the image rendering engine, for each image object element, a set of vertex indicators associated with a particular image object element and a vector code for the particular image object element.

17. The server device of claim 16, wherein the vertex indicators are vertex data points.

18. The server device of claim 16, wherein the vertex indicators are pointers pointing to vertex data points residing in a table of vertex data points, each pointer associated to a separate vertex data point.

19. The server device of claim 16, wherein the one or more server processors update the tracking table after each image object element is sent.

* * * * *